MULTIPLE COMPUTER SYSTEM WITH PROGRAM INTERRUPT

Filed May 29, 1964 8 Sheets-Sheet 1

INVENTOR.
THEODORE M. HERTZ
BY A. M. Fernandez
ATTORNEY

INVENTOR
THEODORE M. HERTZ
BY A. M. Fernandez
ATTORNEY

INVENTOR.
THEODORE M. HERTZ
BY A. M. Fernandez
ATTORNEY

INVENTOR.
THEODORE M. HERTZ
BY A. M. Fernandez
ATTORNEY

INVENTOR.
THEODORE M. HERTZ

BY A. M. Fernandez

ATTORNEY

MULTIPLE COMPUTER SYSTEM WITH PROGRAM INTERRUPT

Filed May 29, 1964 8 Sheets-Sheet 6

INVENTOR.
THEODORE M. HERTZ
BY A. M. Fernandez
ATTORNEY

INVENTOR.
THEODORE M. HERTZ
BY A. M. Fernandez
ATTORNEY

MULTIPLE COMPUTER SYSTEM WITH PROGRAM INTERRUPT

| Bit Location | DIGIT COUNTER ("P" FLIP FLOPS) | | | | | | SPECIAL DIGIT TIMES Indicated by Primary "AND" Gates and T1 and T41 FFs |
|---|---|---|---|---|---|---|---|
| | P6 | P5 | P4 | P3 | P2 | P1 | |
| 1 | 0 | 0 | 0 | 0 | 0 | 0 | 1t1 = T41P6 ot1 = T1 (Flip Flop,T1) |
| 2 | 0 | 0 | 0 | 0 | 0 | 1 | P6'P5'P3'P2'P1 |
| 3 | 0 | 0 | 0 | 0 | 1 | 0 | |
| 4 | 0 | 0 | 0 | 1 | 0 | 1 | |
| 5 | 0 | 0 | 1 | 0 | 1 | 0 | |
| 6 | 0 | 1 | 0 | 1 | 0 | 1 | |
| 7 | 0 | 0 | 1 | 0 | 1 | 1 | |
| 8 | 0 | 1 | 0 | 1 | 1 | 0 | P6'T8 |
| 9 | 0 | 0 | 1 | 1 | 0 | 0 | |
| 10 | 0 | 1 | 1 | 0 | 0 | 1 | |
| 11 | 0 | 1 | 0 | 0 | 1 | 1 | |
| 12 | 0 | 0 | 0 | 1 | 1 | 1 | |
| 13 | 0 | 0 | 1 | 1 | 1 | 0 | P6'P4'T13 |
| 14 | 0 | 1 | 1 | 1 | 0 | 1 | P6T14P2'P1 |
| 15 | 0 | 1 | 1 | 0 | 1 | 1 | |
| 16 | 0 | 1 | 0 | 1 | 1 | 1 | |
| 17 | 0 | 0 | 1 | 1 | 1 | 1 | |
| 18 | 0 | 1 | 1 | 1 | 1 | 0 | P6'P2P1'T14 |
| 19 | 0 | 1 | 1 | 1 | 0 | 0 | P6'P2'P1'T14 |
| 20 | 0 | 1 | 1 | 0 | 0 | 0 | P6'T20 |
| 21 | 0 | 1 | 0 | 0 | 0 | 0 | T41'P5P4'P3'P2' |
| 22 | 1 | 0 | 0 | 0 | 0 | 1 | P6P5'P3'P2'P1 |
| 23 | 1 | 0 | 0 | 0 | 1 | 0 | |
| 24 | 1 | 0 | 0 | 1 | 0 | 1 | |
| 25 | 1 | 0 | 1 | 0 | 1 | 0 | |
| 26 | 1 | 1 | 0 | 1 | 0 | 1 | |
| 27 | 1 | 0 | 1 | 0 | 1 | 1 | |
| 28 | 1 | 1 | 0 | 1 | 1 | 0 | P6T8 |
| 29 | 1 | 0 | 1 | 1 | 0 | 0 | |
| 30 | 1 | 1 | 1 | 0 | 0 | 1 | |
| 31 | 1 | 1 | 0 | 0 | 1 | 1 | |
| 32 | 1 | 0 | 0 | 1 | 1 | 1 | |
| 33 | 1 | 0 | 1 | 1 | 1 | 0 | P6T13 |
| 34 | 1 | 1 | 1 | 1 | 0 | 1 | P6P2'P1T14 |
| 35 | 1 | 1 | 1 | 0 | 1 | 1 | |
| 36 | 1 | 1 | 0 | 1 | 1 | 1 | |
| 37 | 1 | 0 | 1 | 1 | 1 | 1 | |
| 38 | 1 | 1 | 1 | 1 | 1 | 0 | P6P2P1'T14 |
| 39 | 1 | 1 | 1 | 1 | 0 | 0 | P6P2'P1'T14 |
| 40 | 1 | 1 | 1 | 0 | 0 | 0 | P6T20 |
| 41 | 1 | 1 | 0 | 0 | 0 | 0 | T41 1t41=T40+S1IqI2 ot41=T41 (Flip Flop,T41) |

LOGIC FOR SETTING "P" FLIP FLOPS

P1
1p1 = P5'P1'T41'* + T21
op1 = P5'P1 + T41

P2
1p2 = P1T41'*
op2 = P1' + T41

P3
1p3 = P2T41'*
op3 = P2' + T41

P4
1p4 = P3T41'*
op4 = P3' + T41

P5
1p5 = P4T41'*
op5 = P4' + T41

P6
1p6 = T21
op6 = T41

* T41' insures that the FF will not be hit on both inputs.

T13 = P5'P3P2P1' (T13,33)
T14 = P5P4P3 (T14,18,19,34,38,39)
T20 = P5P4P3'P1' (T20,T40)
T8 = P4'P3P1'Ka' (T8,T28)

FIG. 9

INVENTOR.
THEODORE M. HERTZ
BY A. M. Fernandez
ATTORNEY

United States Patent Office 3,312,951

Patented Apr. 4, 1967

3,312,951

MULTIPLE COMPUTER SYSTEM WITH PROGRAM INTERRUPT

Theodore M. Hertz, Whittier, Calif., assignor to North American Aviation, Inc.

Filed May 29, 1964, Ser. No. 371,205

11 Claims. (Cl. 340—172.5)

This invention relates to a multiple computer system, and more particularly to program interrupt and timing features by which a computer may selectively interrupt a program in process in one or more computers and additionally, or alternatively, interrupt its own program after a specified delay period, or terminate an input or output operation after the lapse of a specified period of time if such operation has not already been completed, all in response to a single instruction.

The flexibility and full capability of a multiple computer system is largely dependent upon the ability of one computer to communicate with another. If the receiving computer is not interrupted by the transmitting computer, the receiving computer would have no way of knowing it is to receive a communication unless it is programmed to periodically check for incoming messages. Improved efficiency may be achieved by devising some means of interrupting the main program of the receiving computer instead of having the receiving computer continually check for incoming messages, particularly in applications where such incoming messages would be too infrequent to justify programming the receiving computer to continually check for incoming messages.

It is often advantageous to provide for a delayed interrupt of the main program in progress, particularly in real-time control or data processing applications. In such applications it may be desirable not to specify the delay period until just prior to execution of the instruction which commands such a delayed interrupt. In addition, a special timing function is often desirable for the purpose of ascertaining a failure in a real-time operation. For instance, in an industrial process control application a computer may be called upon to execute an input or output operation which must be completed before proceeding with other instructions. If for some reason the external operation cannot be completed, the computer effectively stalls and the industrial process is left without control until an operator becomes aware of the failure. It is desirable to provide some means for alerting the operator of such a failure at the earliest opportunity.

In the past, a special timing device has been provided to measure the maximum time required to complete an input or output operation, and to set an alarm if the time runs out before the operation is completed. Since different input and output operations may require different times for completion, separate timing devices must be provided; otherwise a universal timer capable of measuring the maximum time of the longest operation anticipated would have to be provided. Improved efficiency could be obtained by providing a universal timer capable of being independently set to measure the time required for each different operation to be checked, particularly in a complex system in which a large difference exists in the times required for the various input and output operations. Otherwise, a long waiting period may result after a failure before the alarm is set.

Accordingly, an object of this invention is to provide a multiple computer system in which a given computer may interrupt one or more computers in the system, including itself.

A further object is to provide a multiple computer system in which a given computer may immediately interrupt one or more computers in the system, including itself, and additionally, or alternatively, interrupt itself after a specified delay period.

Still another object is to provide a computer with a real-time clock which may be set to measure any desired period of time after which the computer program is interrupted.

Another object is to provide a computer having a real-time clock which may be set to measure any desired period of time after which an alarm is set if an input or output operation in process has not been completed.

These and other objects of the invention are achieved in a multiple computer system in which the program in process of one or more computers may be interrupted by one of the computers in response to an instruction having the mnemonic code CON (operation code octal 04) which causes the interrupted computer, or computers, to branch to a predetermined subroutine and then return to the program, or programs, in process. The return is accomplished by instructions at the end of the subroutine and the information required to do so is stored in memory by instructions at the beginning of the subroutine. A computer may also interrupt itself either immediately or after a specified delay period, the delay period being specified by presetting a real-time clock which counts down in response to the instruction CON.

In an illustrative embodiment, an octal digit in the address portion of the instruction format is employed to specify the computers to be interrupted, a binary digit 1 in a given position specifying a particular computer so that if a binary digit 1 appears in more than one position, more than one computer may be interrupted simultaneously. Other octal digits in the address portion are used to address a real-time clock for a delayed interrupt and to start the real-time clock. The time delay desired is preset by storing a number in the addressed real-time clock in response to an instruction preceding the interrupt instruction CON. That number is then counted down. When the selected real-time clock has counted down to zero, the computer is interrupted. In the meantime, the computer may proceed with its main program. In that manner, a computer may interrupt itself either immediately or after a specified delay period.

When a computer has been interrupted, it takes its next instruction from a predetermined location at the beginning of the next word time, or as soon thereafter as the specified location is found. In the illustrative embodiment, that is accomplished by inhibiting the control logic for locating the next instruction in the normal manner and enabling special control logic for reading the next pair of instructions from the sector track of a magnetic disc memory. The first of the two instructions read from the sector track stores the contents of the location counter in the first half of a specified memory location, which may be either in the computer disc memory or in an auxiliary memory unit, and the second instruction transfers to a subroutine beginning in a specified memory location which may be either in the computer disc memory or in an auxiliary memory unit.

Other objects and advantages of the invention will become apparent from the following detailed description with reference to the drawings in which:

FIG. 9 is a chart illustrating the operation of a counter comprising six flip-flops P1 to P6 employed to establish the bit timing periods within a 40-bit word time.

MODE I*c*

Figure 3:
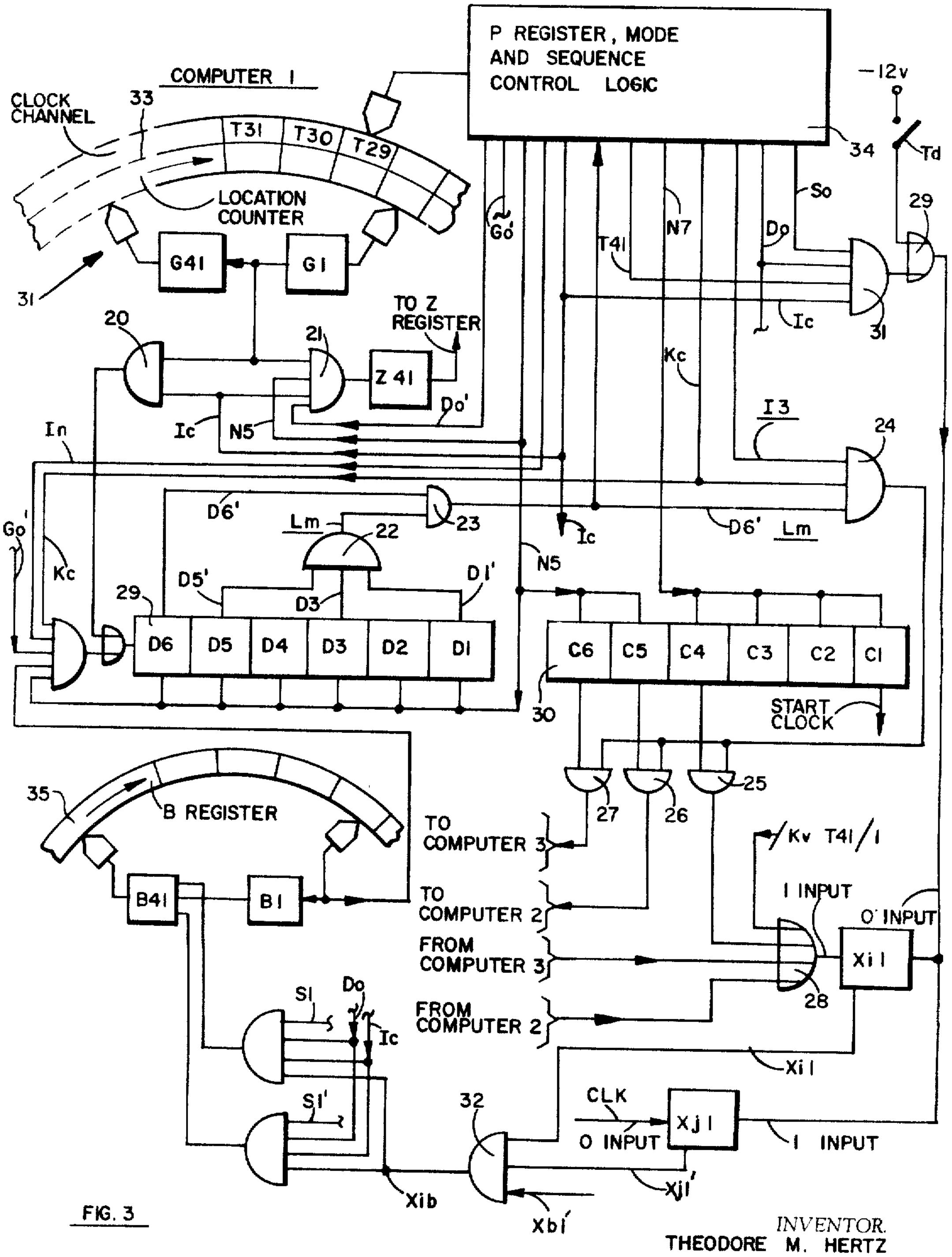
FIG. 3 is a logic diagram of the program interrupt feature of a given computer in the system.
Figure 7:
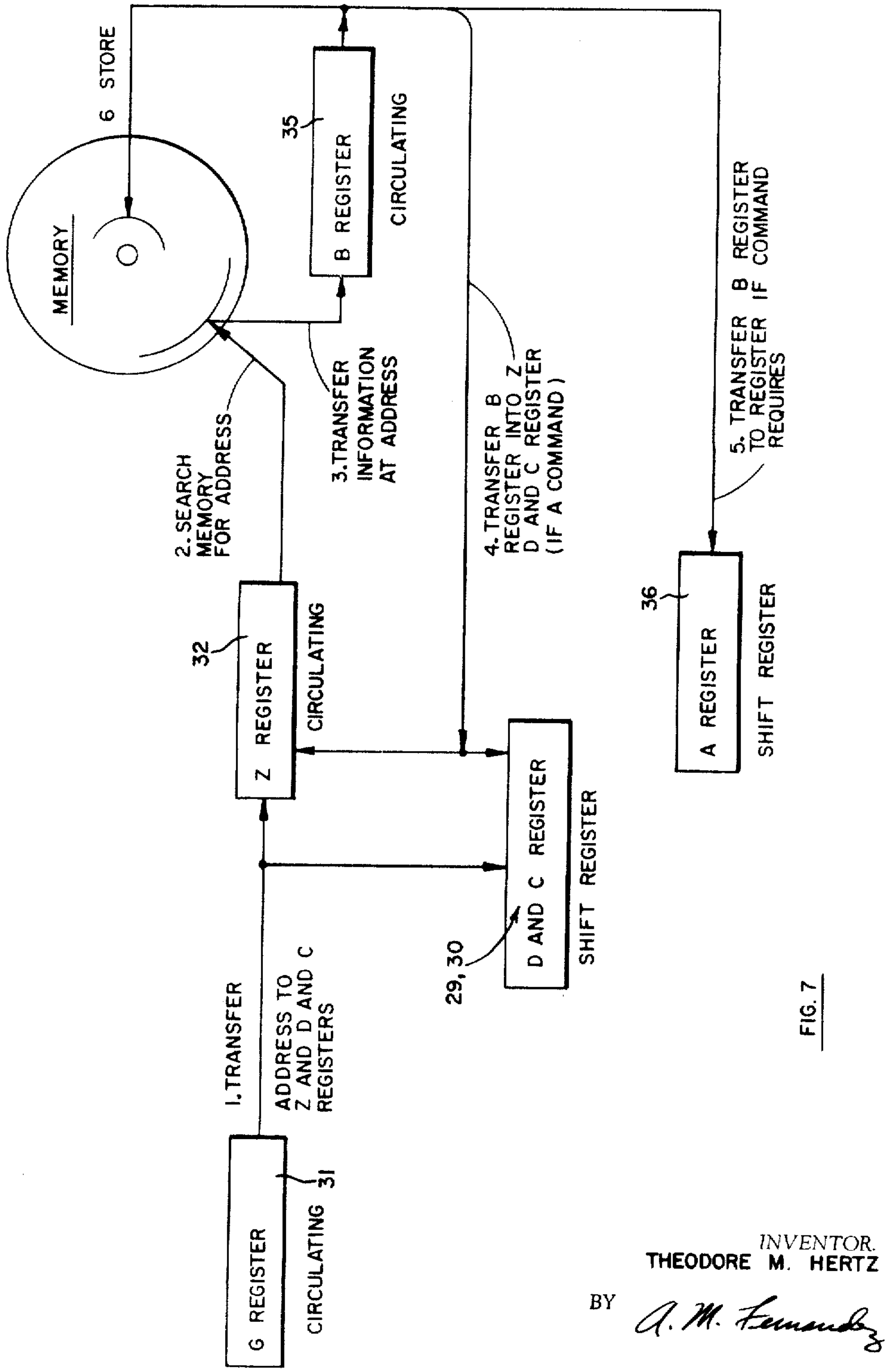
FIG. 7 is a flow diagram for typical operations in a given computer.
Figure 8:
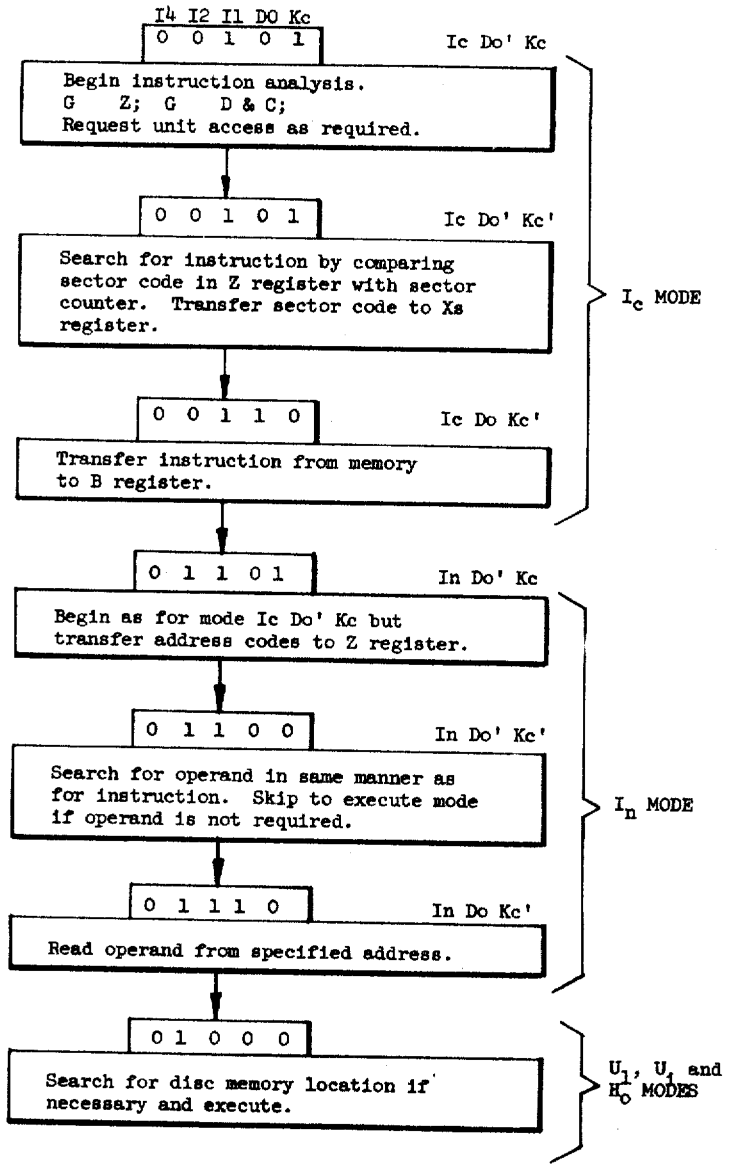
FIG. 8 is a flow chart of various modes of operation in a given computer.

Before considering the detailed description of the programmed interrupt feature, it will be helpful to summarize the opertaion of the arrangement for the instruction analysis mode I*c* illustrated in the flow chart of FIG. 8. During the first word time of the I*c* mode, in a given one of the computers of FIG. 1, such as computer 1, the contents of the G register 31 illustrated in FIG. 3 are transferred to the Z register 32 as well as the D register 29 and C register 30. Those operations are more clearly illustrated in FIG. 7.

The G register 31 (FIG. 3) comprises two flip-flops G1 and G41, and 39 bit positions on a magnetic disc memory track 33. It functions as an instruction location counter and an index register. The location counter portion is the last half, namely bit positions 22 through 34 of which bit positions 23 through 28 specify the sector to be addressed and bit positions 29 through 34 specify the channel in which the sector to be addressed may be located. The bit position 22 specifies the right or the left-hand instruction at that address. A bit 1 in position 22 specifies the right half while a bit 0 specifies the left half.

Figure 1:
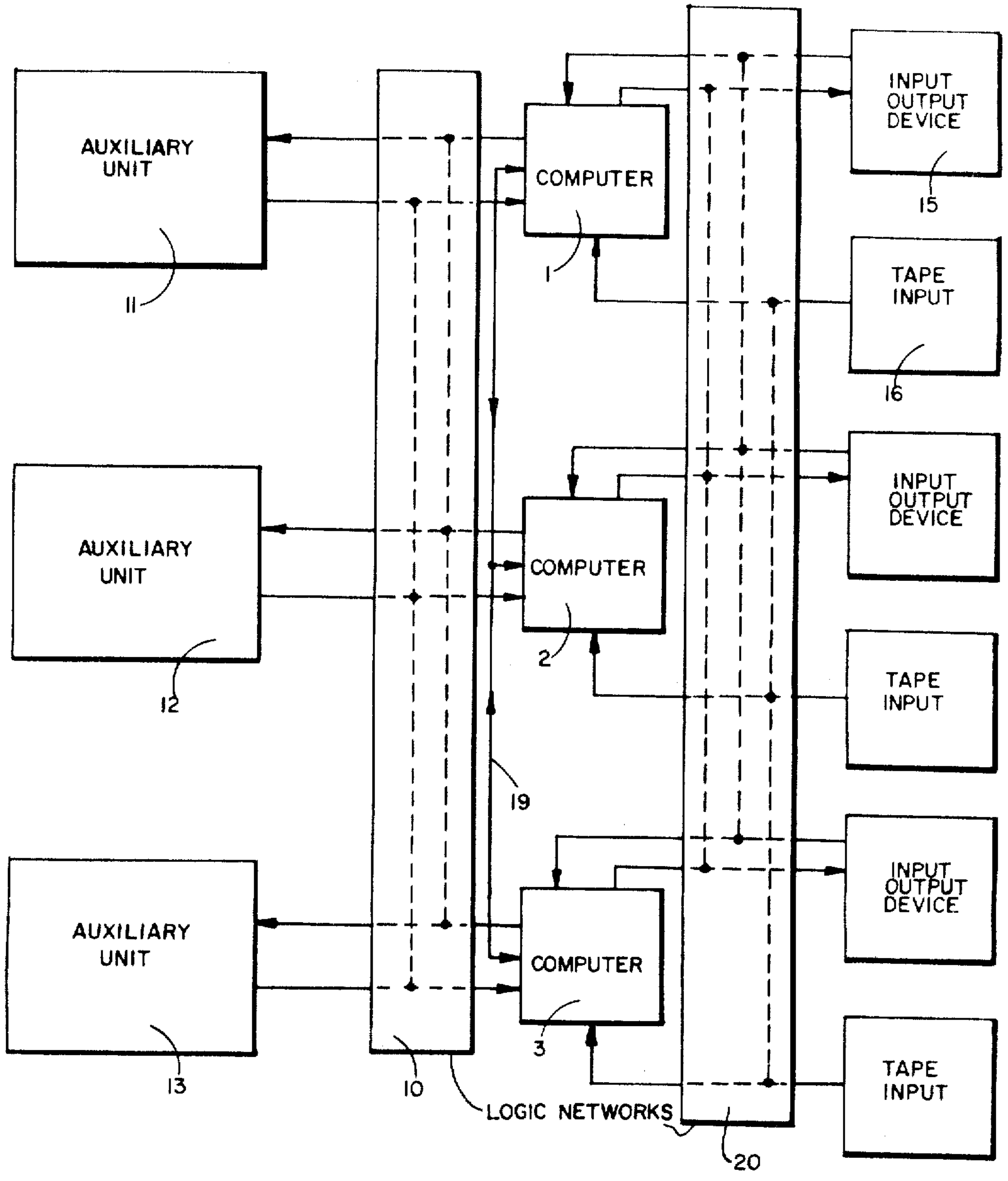
FIG. 1 is a simplified block diagram of a multiple computer system embodying the principles of the present invention.
Figure 4:
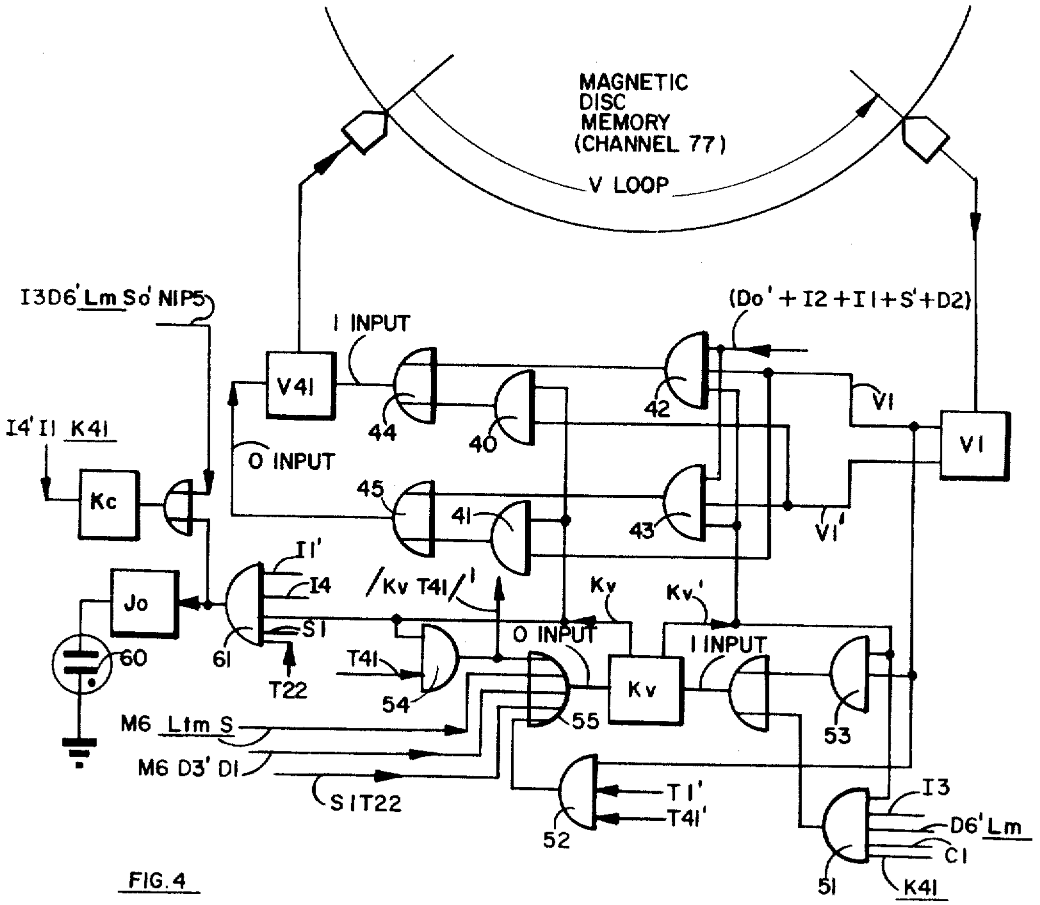
FIG. 4 is a logic diagram of a delayed program interrupt feature in a given computer of the system.

During the first word time of the mode I*c* specified by the control term I*c*D*o*′K*c* illustrated in the flow chart of FIG. 8, the content of bit positions 27 through 34 of the G register are analyzed to determine whether the memory location for the next instruction is in main memory, one of two loops L and V or the memory of an auxiliary unit, and if in a loop or an auxiliary memory unit, to determine which of the two loops, such as the V loop of FIG. 4, or the three auxiliary units, 11, 12 and 13 of FIG. 1 is involved. While this analysis is being performed the G register location counter content is transferred to the flip-flops D1 through D6 (FIG. 3) which are connected as a shift register in accordance with the function G1 I*c* N5 where G1 and I*c* are applied to a gate 20 and N5 is applied as a control term for clock pulses applied to the flip-flops D6 to D1.

The control term N5 is derived by mode control logic 34 which turns a flip-flop N5 on in accordance with the function I*c* K*c* T22 where T22 is a bit-timing pulse which occurs while the content of bit position 22 of the G register is being transferred from the flip-flop G1 to G41. In that manner the content of the G register, starting with the bit position 23, is shifted through the flip-flops D6 through D1.

It should be noted that the entire contents of the G register 31 is transferred to the Z register 32 via a flip-flop Z41 in accordance with the function G1 I*c* K*c* D*o*′ at a gate 21. The sector address portion of the location counter, namely bit positions 23 to 28, of the G register are shifted from the flip-flops D6 to D1 into the flip-flops C6 to C1 also connected as a shift register.

Figure 6:
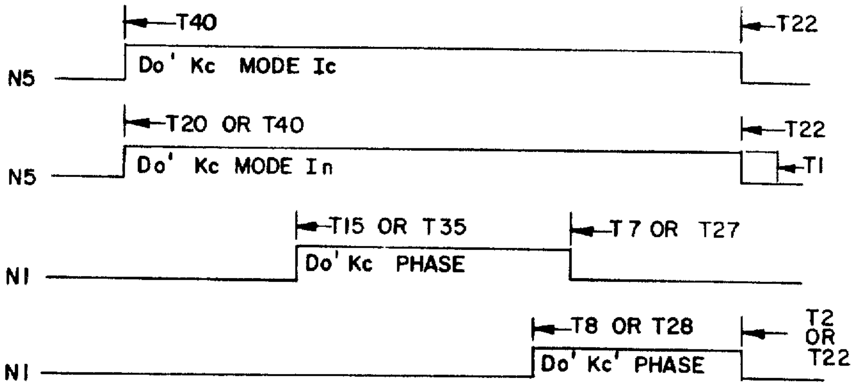
FIG. 6 is a timing diagram of various signals which control operations within a given computer.

Since the control term N5 is turned off by a timing signal T20 representing either the 20th or 40th bit time, the 40th bit time interval is the one during which the flip-flop N5 is reset to terminate shifting to the flip-flops D6 through D1 and C6 through C1 which are connected for this purpose as a single register as illustrated in FIG. 7. In that manner the channel address code, namely bits 29 to 34 are transferred into the C register 30, the content of which is then employed to read the instruction from a specified address in the channel indicated by the channel code in the C register. The output signal N5 during the mode I*c* is illustrated in FIG. 6.

The sector portion of the address, namely bits 23 to 28, are transferred into the Z register, as noted hereinbefore with reference to FIG. 7, so that during the next phase of the mode I*c*, a search is made for the instruction location in response to the control term I*c* D*o*′ *Kc*′ as illustrated in FIG. 8. The search for the instruction location is made by comparing the sector address code in the Z register with sector identifying binary digits read from the sector track through a flip-flop S1. Thus during the first word time of the I*c* mode the sector address is transferred to the Z register and during the second and subsequent word times the sector address code in the Z register is compared with the sector codes read from a sector track by comparing the output of flip-flops S1 and with the output of the flip-flops Z1. If the instruction is to be read from main memory, and not one of the two rapid access recirculating loops L and V, a flip-flop K*a* is reset. Once the specified location has been found, the instruction is transferred into the B register 35 during the last word time of the mode I*c* under the control of I*c* D*o* K*c*′ as noted in FIG. 8.

MODE I*n*

Once an instruction has been read into the B register 35, the next operation is to search for an operand if one is required. Accordingly, the first phase of the next mode I*n* illustrated in FIG. 8 is to transfer the channel and sector codes of the instruction from the B register to the Z register under the control of the term I*n* D*o*′ K*c*. At the same time that the address codes are transferred from the B register to the Z register, the operation and channel addres codes are transferred to the D and C registers via a gate 30. In that manner the operation code is transferred into the flip-flops D1 through D6. If the operation code includes the binary digit pair D5′ D4 or D5′ D4′ a transition is made out of the mode I*n* into an execute mode since instructions having the binary digit pair D5′ D4 or D5′ D4′ in the operation code do not require operands. An example of such an instruction is the instruction SAP having the binary code 0 0 1 0 1 0 which is used to set the sign of the A register 36 positive.

If the instruction is not one in the group having a binary digit pair D5′ D4 or D5′ D4′, the second phase of the mode I*n* is entered into for the purpose of searching for the operand in a manner similar to the second phase of mode I*c* for searching in memory for the location of the next instruction. Thus the first and second phases of the mode I*n* are similar to the first two phases of the mode I*c* since in the first phase of the mode I*n* the memory location of the operand is found by comparing the appropriate sector binary digits read from the sector track through the flip-flop S1 with the sector address code read through the flip-flop Z1. If the location of the operand is in main memory, and not in one of the two loops L and V, the flip-flop K*a* is reset as in searching for the next instruction.

A more detailed description of the modes I*c* and I*n* may be found in a copending application Ser. No. 187,319 filed on Apr. 13, 1962, and now Patent No. 3,237,168. The muiltiple computer system in which the present invention is embodied is described in a copending application Ser. No. 334,346 filed Dec. 30, 1963. Both copending applications are assigned to the assignee of this application.

The system illustrated in FIGURE 1 is described more fully in the above referenced application Ser. No. 334,346. As indicated therein, FIGURE 1 describes an illustrative multiple computer system comprising computers 1, 2 and 3, each associated through a logic network 10 with a respective one of three auxiliary units 11, 12 and 13. Each computer is also associtaed with a group of peripheral devices such as an input-output device 15 and a tape input device 16 through a logic network 20 that enables any computer to select any peripheral device for an input-output operation.

PROGRAM INTERRUPT CONTROL

In accordance with the present invention, each of the computers illustrated in FIG. 1 is provided with the capability of interrupting any one or all of the computers in response to a programmed instruction. The instruction for a programmed interrupt is designated by the mnemonic code CON and has the octal code 04 as its operation code. That octal code was selected because the instruction CON does not require reading an operand as demonstrated by the binary digits D5′ D4′ in the operation code.

The instruction CON will interrupt a computer, or computers, specified by the channel bit positions C4, C5 and C6. If a delayed interrupt is desired, one of seven real-time clocks available in the computer may be used to set the time at which the interrupt will occur. The address portion of the instruction CON is composed as shown in FIG. 6. A bit 1 in the binary digit position C6 of the channel address code will cause the computer 3 to be interrupted by whichever computer is executing the instruction CON. Similarly, a bit 1 in the digit positions C5 and C4 of the channel address code will interrupt the computers 2 and 1, respectively. Thus the most significant octal code digit of the channel address specifies the computer, or computers, to be interrupted. If the octal code is 1X, where X is the least significant octal digit of the channel address, computer 1 will be interrupted. Similarly, if the octal code is 2X or 4X, only the computer 2 or 3 will be interrupted; but if the octal code is 7X, all computers will be interrupted. If only computers 1 and 2 are to be interrupted, the octal code 3X is employed. Thus, the programmer may cause the computer executing the instruction to interrupt selected ones of the computers by composing the code configuration of binary digit positions C4, C5 and C6.

The least significant binary digit of the channel address code in the position C1 of the C register is employed to start or stop a real-time clock and the three least significant binary digits of the sector address code in the Z register are employed to specify one of eight real-time clocks to be started or stopped. The clocks are implemented in memory locations of the V loop of the computer executing the instruction as illustrated in FIG. 4. The eight clocks are addressed by the sector address codes 70 through 77.

When all of the conditions for an interrupt have been met, as when the time specified by a real-time clock has elapsed, the computer to be interrupted is caused to jump to a location immediately preceding sector 70 in its sector track to read a pair of instructions SLC0070TRA7570. The left hand instruction of that pair is an instruction to store the contents of the location counter in the memory location 0070, which is the first step that must be taken in the interrupted computer in order that it may retrieve the address of the next instruction from that location 0070 after completing a subroutine. The second step of the interrupted computer is to transfer operations to the instruction stored in the memory location 7570. That instruction introduces the subrouting which may be any routine that accomplishes a desired function or computation and returns the interrupted computer to its main program. The information required to return to the main is taken from memory locations into which it was stored by the first few instructions of the subroutine.

When all of the conditions necessary to interrupt the computer specified by the instruction CON have been met, the selected computer jumps to a subroutine as just described and a flip-flop X*jn* is set, where *n* is a number corresponding to the interrupted computer, to inhibit any additional interrupts of the specified computer *n* until that flip-flop X*jn* is reset in response to an instruction CLK to clear the left or right-hand address as the last step in returning to the main program. The logic network for the X*j*1 flip-flop of computer 1 is illustrated in FIG. 3. In general, the interrupt instruction CON is used to provide an immediate programmed interruption of any one or more computers in a multiple computer system and a delayed interrupt of the computer executing the instruction CON through the use of a selected real-time clock which is pre-loaded with a number which effectively represents the time to lapse before such a delayed interruption is to take place. The real-time clock counts down the time and then interrupts the computer in the same manner as if the computer were being interrupted by an instruction CON being executed in another one of the computers of the system. Of the eight clocks provided, one at address 70 of the V loop may be selected for special use to set an alarm if an input or output operation is still in progress. The other seven are used for the delayed interrupt feature.

The octal code 04 stored in the D register was chosen for the instruction CON because such a code in a computer mechanized in accordance with the logic description of the aforesaid copending application Ser. No. 187,319 does not require reading an operand as noted hereinbefore. The binary code which specifies the operation octal code 04 is D6′ D5′ D3 D1. Referring to FIG. 3 the last three binary digits D5′ D3 D1′ are combined in a primary gate 22 to form the term $\underline{Lm}$, and then combined with the remaining binary digit $\overline{D6'}$ in a gate 23 to form the term D6′ $\underline{Lm}$ in order to reduce the number of diodes required to decode the operation 04.

The computer is so mechanized that an instruction must be terminated at a bit time T41, which is the last bit time of a given word time. That is accomplished by a primary gate signal $\underline{K41}$ which is equal to T41 K*c*. Accordingly, a flip-flop K*c* (FIG. 4) must be set while the instruction CON is being executed. To accomplish that, the computer executing an instruction CON to interrupt either itself or another computer sets its own flip-flop K*c*. That flip-flop is one of the mode control flip-flops indicated in the flow chart of FIG. 8 and is set in response to the primary gate signal $\underline{Lm}$ and the signal D6′ in accordance with the following logic equation:

$$1Kc=\underline{I3}\ D6'\ \underline{Lm}\ So'\ N1\ P5 \quad (1)$$

$$0Kc=I4'\ I1\ \underline{K41} \quad (2)$$

In that equation, the primary gate term $\underline{I3}$ (which is equal to I4′ I1′ D*o*′ I3*a*′) is generated by the computer only while it is in the execute phase and is included in the control gate for setting the flip-flop K*c* to insure that the required termination occurs only during the execute phase.

The sector address code of each instruction being executed is compared with the sector codes read from the sector track through the flip-flop S1 of the memory in order to search for the memory location specified in the manner generally described hereinbefore and more particularly described in the aforesaid copending application Ser. No. 187,319. When the address location has been found, a sector comparison flip-flop S*o* is reset. For instance, if the instruction CON being executed specifies that the computer interrupt itself at the conclusion of a time period specified by a specified one of eight real-time clocks, the sector comparison flip-flop S*o* is not reset until the specified real-time clock has been located. As noted hereinbefore with reference to FIG. 5, the least significant binary digit of the channel code in the instruction CON being executed is employed to start the real-time clock selected. The clock then measures out the time by counting periodic timing signals in a manner to be described more fully hereinafter. When the real-time clock specified has been located and started, the sector comparison flip-flop S*o* is reset and the flip-flop K*c* is set in accordance with the foregoing Equation 1, thereby allowing the next bit timing signal T41 to generate the primary gate signal K41 which terminates the execute mode of the computer and allows the computer to enter into a mode I*c* for the purpose of fetching the next instruction to be executed.

If the computer executing an instruction CON is to interrupt itself immediately or is to interrupt one of the other computers as specified by the three most significant binary digits of the channel address code, the search for a memory address is not required. However, the sector comparison flip-flop S*o* must be reset in order to set the K*c* flip-flop and eventually terminate the execute mode. It should be noted that regardless of what binary code is placed in the sector of the address portion of the instruction CON, the flip-flop S*o*′ will be set some time during the next complete memory cycle. In order to be able to terminate the execute mode at the earliest opportunity, the address of a sector which corresponds to the next sector to be scanned may be placed in the address portion of the instruction CON.

The signals N1 P5 of Equation 1 represents the bit times T6 to T26 and specify the time of completion of the sector comparison process. Which of the signals P5 illustrated in FIG. 9 accurring at bit times T6 or T26 is effective depends upon the N1 control signal which is provided in accordance with the following equation:

$$\mathbf{1}N\mathbf{1} = Go\ T\mathbf{2}\ Kc' + Go'\ T\mathbf{22}\ Kc' \qquad (3)$$

where G*o* specifies the left-hand instruction sector address code and G*o*′ specifies the right-hand instruction sector address code. Thus the time of completion of the comparison process for the required three least significant binary digits of the sector address code is T6 for a right-hand instruction and T26 for a left-hand instruction as shown in FIG. 6.

It should be noted with respect to the first phase of the mode I*n* that the operation code and channel address of the right-hand instruction is entered into the D and C registers in the first instance and remains therein only if a right-hand instruction is to be executed. If a left-hand instruction is to be executed, a bit 1 in position 22 of the instruction is sampled by the function G1′ T22 I*n* D*o*′ to set the control flip-flop G*o* for a left-hand instruction which allows the operation code and channel address of the left-hand instruction to be transferred into the D and C registers.

An interrupt control flip-flop **X*in*** is provided in each computer where *n* represents the number 1, 2 or 3 of the computer with which the interrupt control flip-flop is associated. The control logic for setting and resetting the interrupt control flip-flop **X*in*** is as follows:

$$\mathbf{1}Xin = \sum_{j=1}^{3} [\underline{\mathbf{I3}}\ D\mathbf{6}'\ \underline{Lm}\ Kc\ C(n+3)]j + (Kv T\mathbf{41})n \qquad (4)$$

$$\mathbf{0}Xin = (Ic\ Do\ So\ T\mathbf{41})n \qquad (5)$$

where *j* is equal to a number 1, 2 or 3 which corresponds with the number of the computer executing the instruction CON. Thus, in the foregoing general logic equation, *n* represents the number of the computer being interrupted and *j* represents the computer causing the computer *n* to be interrupted. As noted hereinbefore, the term $\underline{\mathrm{I3}}$ is a primary gate signal which occurs during the execute mode of operation, but only when a flip-flop $\underline{\mathrm{I3}a}$ is reset or is false indicating that the operation to be performed is not an arithmetic operation, in accordance with the following logic equation:

$$\underline{\mathbf{I3}} = I\mathbf{4}'\ I\mathbf{1}'\ Do'\ I\mathbf{3}a' \qquad (6)$$

The term I4 is derived from a flip-flop which is set true only during input-output operations and is false during the execution of all other instructions. The I1 term distinguishes the modes I*c* and I*n* from execute modes of operation. When the term I1 is false, the computer is in the execute mode of operation; at all other times it is in the I*c* or I*n* mode of operation.

The term D6′ $\underline{\mathrm{L}m}$ of Equation 4 is derived from the operation code of the instruction CON as explained hereinbefore. The term K*c* is provided by the flip-flop set by the logic defined in Equation 1. The term $C(n+3)$ is the channel address flip-flop in the C register of the computer executing the interrupt control instruction CON which is programmed to identify the computer *n* being interrupted. For example, if computer 1 is being interrupted $C(n+3)$ is equal to C4. The alternate term K*v* T41 for setting the interrupt control flip-flop X*in* is employed only for a delayed interrupt through the use of a real-time clock as generally described hereinbefore.

The logic for resetting the interrupt control flip-flop X*in* in accordance with Equation 5 indicates that only the interrupted computer *n* can reset the flip-flop X*in*. The term I*c* is a primary gate signal equal to I4′ I2′ I1 which indicates the instruction search mode I*c*. The term D*o* is generated by a flip-flop the main function of which is to identify those periods of time that information is to be stored in or read from memory. The term S*o* indicates that the memory location of the next instruction has been located. Accordingly, the terms I*c*, D*o* and S*o* collectively indicate that the next instruction is being read from the appropriate sector track. That memory location is in the sector immediately preceding sector 70 of the sector track in which the instructions SLC 0070 and TRA 7570 are stored.

The left-hand instruction SLC is executed first to store the contents of the location counter in the memory location 0070. Following that, the right-hand instruction TRA is executed to unconditionally transfer to the memory location 7570 from which a pair of instructions are read one of which is used to introduce a sequence of instructions to be executed by the interrupted computer *n* before returning to its main program. The timing signal T41 insures that the interrupt control flip-flop X*in* is not reset until both of the instructions SLC and TRA have been read from the sector track.

The general logic Equations 4 and 5 are written for a given computer in a multiple computer system including only three computers as follows:

$$\mathbf{1}Xi\mathbf{1} + |\underline{\mathbf{I3}}\ D\mathbf{6}'\ \underline{Lm}\ Kc\ C\mathbf{4}|^1 + |\underline{\mathbf{I3}}\ D\mathbf{6}'\ \underline{Lm}\ Kc\ C\mathbf{4}|^2 + |\underline{\mathbf{I3}}\ D\mathbf{6}'\ \underline{Lm}\ Kc\ \overline{C\mathbf{4}}|^3 + |\overline{Kv\ T\mathbf{41}}|^1$$

$$\overline{\mathbf{0}Xi\mathbf{1}} = |Ic\ Do\ So\ T\mathbf{41}|^1 + |Td|^1 \qquad (7)$$

Similar equations may be written for computers 2 and 3. A gate 24 shown in FIG. 4 generates the terms $\underline{\mathrm{I3}}$ D6′ $\underline{\mathrm{L}m}$ K*c* for computer 1. Gates 25, 26 and 27 translate that term to the interrupt control flip-flop X*i*1 of the respective computers 1, 2 and 3. Similar terms are translated to the interrupt control flip-flop X*i*1 of computer 1 from computers 2 and 3 via an OR-gate 28. The term K*v* T41 from computer 1 is associated with the delayed interrupt feature illustrated in FIG. 4. The two terms for resetting the flip-flop X*i*1 of computer 1 are applied through an OR-gate 29. The signal T*d* is generated by a manually operated switch T*d* to initially reset the flip-flop X*i*1. The other reset term is produced by a gate 31.

Although only three computers are provided in an illustrative embodiment of the invention, it should be obvious that the system may be expanded to any number of computers.

Since the bit position C1 of the C register containing the channel address is used to start a real-time clock when one is specified by the three least significant binary digits of the sector address code, only five bit positions remain in the C register of the present embodiment. Accordingly, only two more computers could be added without changing the instruction format of the computer or otherwise redesigning the computer. However, the present invention relating to a program interrupt control in a multiple computer system is not to be considered as limited to the use of a computer of the type described in the aforementioned copending applications. Other computers having instruction formats with more binary digits available for addressing computers to be interrupted could be employed. Alternatively, to expand the system to more than five computers using a computer having an instruction word format which allots only five binary digits for addressing computers, a decoding matrix may be employed to use a five-bit binary code system for specifying which computer is to be interrupted. That would permit as many as 32 computers to be connected in a system, but without making some further provision it would result in a system in which a given computer may interrupt only one computer at a time whereas in the illustrative embodiment of the invention, each of the channel code positions C4, C5 and C6 is employed to address a separate computer to be interrupted so that one, two or three computers may be interrupted at one time. If the system were to be expanded to five computers using all of the channel code positions C2 to C6, one to five computers may be interrupted at one time.

As noted hereinbefore, when the interrupt control flip-flop X*in* for a given computer is set, the next instruction pair is read from a predetermined memory location in the sector track. This jump to the predetermined memory location in the sector track is accomplished by first inhibiting the sector comparison flip-flop S*o*. Since sector comparison is indicated by resetting the flip-flop S*o*, sector comparison is inhibited by forcing the flip-flop S*o* to be set in response to the following logic equation:

$$1So=\underline{Xib}\ \underline{Ic}\ T1 \qquad (8)$$

where $\underline{Xib}$ is a primary gate signal derived from a gate 32 which combines the output of an interlock control flip-flop X*j*1 and a flip-flop X*b*1 (FIG. 2) which indicates that computer 1 is communicating with an auxiliary unit as described in the aforementioned copending application Ser. No. 334,346 and therefore should not be interrupted. Since the sector comparison flip-flop S*o* cannot be reset, the logic employed to read the next instruction from a memory location specified by the location counter in the usual manner is inhibited and the next instruction is read from a predetermined memory location in the sector track. That location is predetermined by storing a bit 1 in the sign bit position of only the immediately preceding location in the sector track, namely sector 66 when the predetermined location is sector 67. Accordingly, the read control flip-flop D*o* is set in accordance with the following logic equation:

$$1Do=\underline{Xib}\ \underline{Ic}\ S1\ T41 \qquad (9)$$

The term I*c* assures that the flip-flop D*o* is set only during the mode I*c* illustrated in FIG. 8. The timing signal T41 is provided to sample the content of the flip-flop S1 once during each word time while it contains the sign bit of the sector being scanned. Since only one sector in the sector track has a binary digit 1 in the sign bit position, the predetermined sector from which the next instruction is to be read is located without the use of the location counter and the sector comparison flip-flop S*o*. It is important not to use the sector comparison flip-flop S*o* because to do so would require altering the content of the location counter, and the contents of the location counter must be left intact until the instruction SLC is executed to store the content of the location counter in memory location 0070. The term $\underline{Xib}$ assures setting the flip-flop D*o* only when the computer with which that primary gate signal is associated is being interrupted, either by itself or by one of the other computers. A primary gate 32 provides the term $\underline{Xib}$ in accordance with the following equation.

$$|\underline{Xib}|^n=|Xi1\ Xj1'|^n\ Xbn' \qquad (10)$$

where X*j*1 is set by the logic I*c* D*o* S*o* T41 and *n* is the computer being interrupted. For instance, if the computer 1 is being interrupted, its interrupt control flip-flop X*i*1 is set in accordance with the foregoing Equation 6 and its associated flip-flop X*b*1 must be in its reset or false state to assure that the computer 1 being interrupted is not engaged in communications with an auxiliary unit of FIG. 1. As noted hereinbefore, the flip-flop X*j*1 functions an an interlock control to prevent the interrupted computer from being interrupted again after it has branched into a subroutine and before it has returned to its main program. Thus, in general terms, the primary gate term $|\underline{Xib}|^n$ will allow its associated computer *n* to be interrupted only after the interrupt control flip-flop X*in* is set in accordance with Equation 5 and the $|Xj1|^n$ flip-flop is still in the false state to which it was previously reset by an instruction CLK executed as the last instruction of the subroutine executed as a result of the last previous interruption.

During the first phase of the instruction analysis mode I*c*, a flip-flop K*a* is utilized to store information concerning the character of the address code read from the G register. The flip-flop K*a* is set by the logic $$1Ka=I1\ Kc\ T1+I1\ Kc\ Go'\ P5'\ P3'\ P2$$

The first term I1 K*c* T1 is for right-hand instructions and the term I1 Kc Go′ P5′ P3′ P2 is for left-hand instructions. The flip-flop K*a* functions in a similar manner for the next mode I*n*.

During the mode I*c*, the content of the G register is transferred to the Z register as illustrated in FIG. 7 through the flip-flop Z41 shown in FIG. 3. Accordingly, the term for resetting the flip-flop K*a* which analyzes the signals Z41′ may occur while the right-hand or left-hand instructions are being transferred in accordance with the logic $0Ka=Z41'\ I1\ Kc\ N1$ where the term N1 is generated by a flip-flop N1 which is turned on at time T7 and T27 and turned off at time T15 and T35 as illustrated in FIG. 6. Because of the allocation of codes 0 0 0 0 through 7 7 5 7 for main memory, it should be noted that a main memory address may be distinguished from an L or V loop memory address in that at least one bit 0 must appear in one of the bit positions 34 to 27 of the left-hand address or one of the bit positions 14 through 7 of the right-hand address. Thus, if the term N1 is generated for the bit times 7 to 15 and 27 to 35 the flip-flop K*a* will be reset if the flip-flop Z41 contains a zero in any of the bit positions 7 through 14 or 27 through 34, thereby identifying the address as being a main memory address. This analysis of the address is performed for both the first phase of mode I*c* and the first phase of mode I*n*.

As noted hereinbefore, the sector comparison flip-flop S*o* indicates that the next instruction is to be read from the sector track when it is set in accordance with Equation 8. Although the principal function of the flip-flop S*o* is to provide sector comparison, it is also used in the multiple computer system described in the aforementioned copending patent application as an interlock to prevent addressing the computer magnetic disc memory at times when the core memory of an auxiliary unit is to be addressed. To accomplish that, the flip-flop S*o* is employed to prevent the flip-flop D*o* from being set by the normal logic for searching, either for an instruction during the mode I*c* or an operand during the mode I*n*. Thus, for addressing the main magnetic disc memory, the term D*o* K*a′* S*o′* is true while for reading from the sector track in response to an interrupt control instruction CON, the term D*o* S*o* is true and for reading from a loop, V or L the term D*o* K*a* is true. In order that both flip-flops K*a* and S*o* may not be set at the same time, thereby causing both the sector track and a loop V or L to be read simultaneously, the term K*a* is reset while the flip-flop S*o* is set to read the next instruction from the sector track in response to an interrupt control instruction CON. That is accomplished in a given computer *n* by the following logic equation.

$$0Ka=Xib\ Ic\ T1 \qquad (11)$$

Thus, when the interrupt control flip-flop X*in* of the computer *n* is set in response to an interrupt control instruction CON being executed by any one of the computers 1, 2 or 3, reading from the main memory or a loop is prevented and the next instruction is read from the sector track in accordance with the following equations:

$$1B41 = Si\ Do\ Xib\ \underline{Ic} \qquad (12)$$

$$0B41 = Si'\ Do\ Xib\ \underline{Ic} \qquad (13)$$

where B41 is the sign bit position flip-flop of the B register which is employed to read the next instruction from sector 17 of the sector track via gates 35 and 36 of FIG. 3. The B register consists of three flip-flops and 38 bit positions in the disc memory. Thus, the B register is a recirculating register as described in the aforementioned copending patent application Ser. No. 187,319. Every operand or instruction transferred into or out of memory is routed through that B register.

In operation, an interrupt instruction CON, read into the D, C and Z registers in the manner described with reference to FIG. 7, is decoded by gates 22 and 23 of FIG. 3. The channel address portion of the instruction is decoded by gates 25, 26 and 27, but not until the execute mode of operation is established by the term $\underline{I3}$ applied to the gate 24, whereupon the flip-flop X*in* of the computer, or computers, to be interrupted is set via an OR-gate 28. For instance, if the channel code of a given instruction CON executed by computer 1 is C6 C5′ C4, computers 1 and 3 are interrupted by signals transmitted through gates 25 and 27. The computers are interrupted by primary gate signals X*ib* developed by the gates 32 of the respective computers, as shown in FIG. 3 for computer 1. The signals X*b*1′ applied to the gate 32 assures that the computer is not interrupted by another computer while it is engaged in addressing one of the auxiliary units 11, 12 and 13 (FIG. 1). The interlock flip-flop X*j*1, previously reset by an instruction CLK, enables the gate 32. When the flip-flop X*i*1 is reset by the gate 31, the flip-flop X*j*1 is set, thereby disabling the gate 32 from transmitting another signal X*ib* to interrupt the computer again until the flip-flop X*j*1 is again reset by an instruction CLK at the end of the subroutine as the last operation before proceeding with the main program that has been interrupted. Once the computer has been interrupted, the next instruction is taken from a predetermined location instead of the location specified by the location counter, bit positions 22 through 34 of the G register described in the aforementioned copending application Ser. No. 187,319.

DELAYED PROGRAM INTERRUPT

Figure 5:
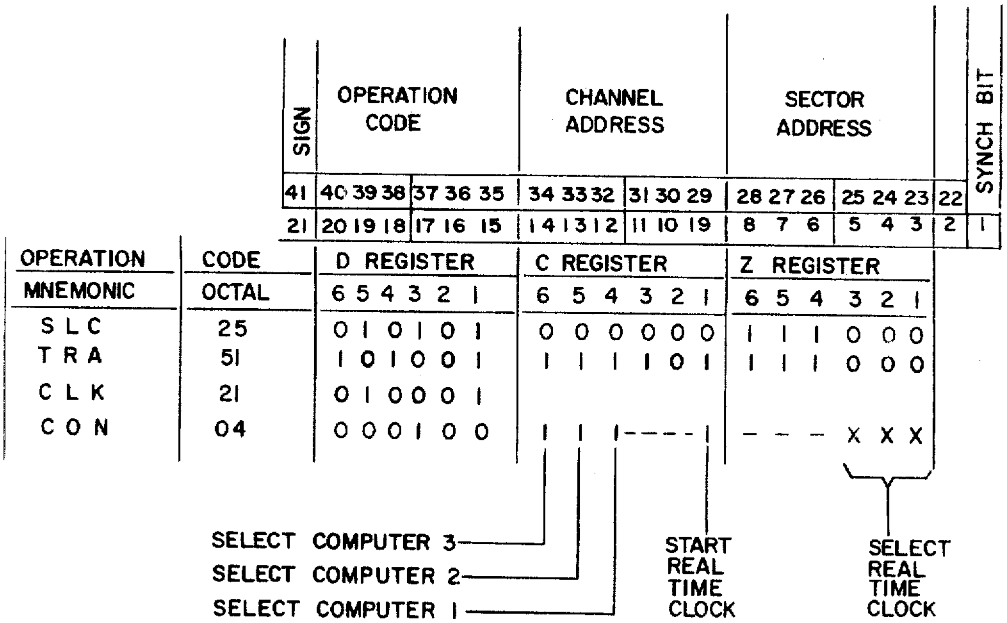
FIG. 5 is a diagram illustrating the format of computer instructions employed in the practice of the present invention and the operation codes thereof.

As noted hereinbefore, a computer may interrupt itself immediately in response to an instruction CON in the same manner as it would interrupt any other computer and in addition, or alternatively, interrupt itself after a specified delay period. A delayed interrupt is specified by a binary digit 1 in the least significant bit position C1 of the channel address in the instruction CON as shown in FIGS. 3 and 5.

Eight real-time clocks are provided, seven for the delayed interrupt feature and one for a special timing feature. These clocks are implemented in the eight word locations of the V loop, at addresses 7770–7777 of the computer disc memory. The three least significant binary digits of the sector address are employed to address a selected one of the real-time clocks for a given delayed interrupt instruction. The clocks are numbered 0 through 7 and are addressed by the octal digit codes 0 0 0 through 1 1 1, respectively, of the least significant octal digit of the address as shown in FIG. 5.

The clock 0 is a special real-time clock in that if it completes measurement of the specified time during an input-output operation, it may terminate the operation and will set an alarm, but not interrupt the computer. Its use is primarily to assure that a computer performing an input or output operation is not stalled due to some failure in the input or output device since the computer performing the input or output operation is normally programmed to complete the input or output operation before proceeding with another operation. If the input or output device fails so that the operation cannot be completed, the computer is unable to proceed with its stored program. By executing a CON instruction addressing the special real-time clock 0 in the V loop before entering into an input or output operation, the operator is provided with an alarm in the event of a failure in the input or output operation which prevents it from being completed by the end of the time specified in the special real-time clock.

The delay period to be measured by a given real-time clock in response to a CON instruction is determined by a number pre-stored in the specified real-time clock in response to a normal instruction STO to store the number in the memory location employed for the real-time clock function, or in response to a CTV instruction to copy the number to the memory location in the V loop.

The real-time clock selected measures time by counting down the number stored therein by an increment of 1 every 8 word times which is an increment of 1 every recirculation cycle of the V loop. Accordingly, the number to be stored in a given real-time clock for a delayed interrupt is equal to the desired delay time divided by the recirculation time of the V loop which is 8 word times. Thus, a real-time clock is a time counting register which generates an interrupt signal after a specified length of time in accordance with the second term of Equation 4.

The logic added to each of the computers to mechanize the real-time clocks comprises a unit subtractor added to the V loop in the manner illustrated in FIG. 4. The normal recirculation of data in the V loop through a read flip-flop V1 to a write flip-flop V41 is modified to provide the complement of the read flip-flop V1 to the write flip-flop V41 when a control flip-flop K*v* is set in accordance with the following equations:

$$1V41 = V1'\ Kv \qquad (14)$$

$$0V41 = V1\ \ Kv \qquad (15)$$

The normal recirculation of data in the V loop from the flip-flop V1 to the flip-flop V41 is in accordance with the following equations:

$$1V41 = V1\ Kv'\ (Do' + I2 + I1 + S' + D2) \quad (16)$$

$$0V41 = V1'\ Kv'\ (Do' + I2 + I1 + S' + D2) \quad (17)$$

Thus, the composite control logic for the write flip-flop V41 functioning as a real-time clock with a unit subtractor subtracting a binary 1 from a number stored in a selected V loop location as shown in FIG. 4 where gates 40 and 41 provide the function of Equations 14 and 15 and gates 42 and 43 provide the function of Equations 16 and 17, respectively. OR-gates 44 and 45 combine those control functions at the 1 and 0 input terminals of the flip-flop V41. It may be shown that the combined equations define a binary subtractor in which the subtrahend is assumed to be 0 and the control flip-flop K*v* functions as a borrow flip-flop into which a bit 1 is inserted once during the first bit time of each recirculation cycle of the selected real-time clock.

In operation, a delayed interrupt instruction CON is decoded in the manner described with reference to FIG. 3 to provide a control term D6′ $\underline{Lm}$. The selected real-time clock is addressed in the usual manner as described in the aforementioned copending application. Once the selected real-time clock is located in the V loop, an accomplishment completed by the end of the word time just prior to the recirculation of the content of that real-time clock through the flip-flops V1 and V41, the control flip-flop K*v* is set through a gate 51 in accordance with the following equation:

$$1Kv = \underline{I3}\ D6'\ \underline{Lm}\ C1\ \underline{K41}\ Kv' \qquad (18)$$

where $\overline{K41}$ is equal to Kc T41. At the next bit time T1, the borrow digit 1 effectively inserted into the control flip-flop Kv by its being set through gate 51 is transferred into the flip-flop V41. That is effectively accomplished through gate 40 in response to the control terms V1′ Kv. That is so because the binary digit stored in the synch bit position 1 of the V loop location is normally a binary digit 0. Since setting the flip-flop Kv causes the complement of the flip-flop V1 to be transferred into the flip-flop V41, a binary digit 0 read into the flip-flop V1 for transfer to the flip-flop V41 at time T1 is a binary 0, the binary digit actually transferred to the flip-flop V41 at time T1 is a binary digit 1. This binary digit stored in the first or least significant bit location, the synch bit location as shown in FIG. 5, constitutes a flag identifying the memory location of the succeeding digits in positions 2 through 41 as the real-time clock storing a number to be counted down to zero by increments of 1 once during each recirculation cycle of the V loop. During the following bit times T2 through T40 all binary digits read and transferred from the flip-flop V1 to the flip-flop V41 are complemented up to and including the first binary digit 1. That is accomplished through gates 40 and 41 in accordance with the logic of Equations 14 and 15.

The first binary digit 1 read via the flip-flop V1 sets the flip-flop Kv so that although that first binary digit 1 is complemented upon being transferred to the flip-flop V41 via gates 40 and 41, subsequent binary digits are not complemented but rather transferred directly to the flip-flop V41 via gates 42 and 43 in accordance with the logic of Equations 16 and 17. In those equations, the terms within the parenthesis taken as a group constitute the complement of Do I2′ I1′ SD2′ which controls the operation specified by the instructions CTV and STO to respectively copy a word or number into a V-loop location and to store in that memory location. The term S designates the V loop. In that manner, the normal operation of the V loop is preserved in order to assure that the number in the real-time clock being addressed is recirculated in the normal manner through the gates 42 and 43 after the flip-flop Kv is reset via the gate 52 unless either one of the instructions CTV and STO is being executed.

It should be noted that the gate 52 is not effective to reset the flip-flop Kv during periods T1 and T41 since the flip-flop Kv is to be set during the period T41 through the gate 51 as described hereinbefore, and thereafter set again once during each recirculation cycle of the V loop via a gate 53 in response to the flag bit placed in the least significant bit position of the real-time clock location during the first recirculating cycle. The logic for that gate 53 is as follows:

$$1Kv = V1\ Kv'\ T1 \qquad (19)$$

If the flip-flop Kv is not reset by time T41 via gate 52, it is reset at T41 via gate 54. That occurs after the number stored in the selected real-time clock has been counted down to zero so that a binary digit 1 is not read via the flip-flop V41 to reset the flip-flop Kv via the gate 52. Thus the gate 54 transmits a pulse at time T41 to reset the flip-flop Kv only at time T41 of the recirculation cycle immediately following the cycle during which the number stored in the selected real-time clock has been counted down to zero. That pulse transmitted via the gate 54 is also applied to the flip-flop Xin of the computer *n*, such as the flip-flop Xi1 of computer 1 as illustrated by the term $|Kv\ T41|^1$ applied to the OR-gate 28 in FIG. 3. Once the interrupt flip-flop Xin has been set, the computer *n* is interrupted in the manner described hereinbefore with reference to FIG. 3.

An OR-gate 29 is employed to couple the gate 55 to the 0-input terminal of the flip-flop Kv in order that it may be reset not only by the output of the gates 52 and 54 but also by the term M6 $\underline{Lfm}$ S or M6 D3′ D1 or S1 T22, each of which is a control term generated in response to an instruction for respectively storing in the V loop or copying from a memory location to the V loop or using the special real-time clock to check for the completion of an input or output operation.

SPECIAL REAL-TIME CLOCK

The special real-time clock comprises the memory location specified by the octal address digit 0 in the position shown in FIG. 5. That address is the first of the eight V loop memory locations. The function of the special clock is as noted hereinbefore to terminate input or output operations after a predetermined time designated by the number stored therein if the input or output operation has not been completed. It does not interrupt the computer; it merely terminates the operation and sets an alarm which for convenience is designated to be the overflow flip-flop Jo which turns on a neon lamp 60. In other words, if the time specified by the special real-time clock runs out before the input or output operation has been completed, the operation is terminated and the neon lamp 60 is turned on.

The special real-time clock is mechanized for operation in the same manner as other real-time clocks except that the flip-flop Kv is sampled for a binary digit 1 at time T22 by a gate 61 to set the flip-flop Jo if the counter has counted down to zero instead of at the time T41 via gate 54 to set the flip-flop Xin.

In order to identify bit position 22 of the special real-time clock, the sector track is recorded with a binary digit 1 at each time T22 for all sector address locations ending in an octal code 0, and a binary digit 1 in position 22 for all other addresses. In that manner when the number in the special real-time clock has been counted down to the point where a binary 1 is not read to reset the flip-flop Kv prior to time T22, the flip-flop Kv will be enabled at time T22 to set the flip-flop Jo in accordance with the following logic equation:

$$1Jo = S1\ Kv\ T22\ I4\ I1' \qquad (20)$$

At the same time, the mode control flip-flop Kc is reset to terminate the EXECUTE mode of operation in the computer in accordance with the following equation:

$$1Kc = S1\ Kv\ T22\ I4\ I1' \qquad (21)$$

The terms I4 and I1′ in the foregoing equations for setting the flip-flops Jo and Kc identify the operation being terminated as an input or output instruction; accordingly, gate 61 is not enabled except during the execution of an input or output instruction.

The bit time T22 was selected for terminating the special real-time clock period because a 20-bit number in bit positions 2 to 21 of the specified V loop memory location would provide a sufficiently long delay time to allow an input or output operation to be completed, but any earlier or later bit time could have been just as easily selected. The exact time, of course, is specified by the program which must store a number in the special real-time clock location before executing an instruction CON addressing that special real-time clock.

From the foregoing description of the program interrupt feature illustrated in FIG. 3 and the delayed interrupt feature illustrated in FIG. 4 it may be seen that any one of the computers 1, 2 or 3 illustrated in FIG. 1 may interrupt itself or any other computer immediately by executing a CON instruction with a binary digit 1 in the binary positions C4, C5 and C6 of the channel address code to select the computers 1, 2 or 3, respectively. Additionally, or alternatively, a given computer may interrupt itself after a delayed period by setting a binary digit 1 in the position C1 of the channel address code and addressing any one of the seven real-time clocks in the V loop memory locations. Instead of a delayed interrupt, a delayed termination of an input or output operation may be provided in a manner similar to a delayed interrupt by addressing the special real-time clock. However, such a delayed termination of an input or output operation does not interrupt the computer since a signal is transmitted by the gate 61 in FIG. 4 only to the flip-flops Kc and Jo if a failure in the system has prevented the computer from completing the input-output operation and proceeding to another instruction in its program. The operator attending the system must detect the malfunction by observing that the overflow light 60 has been turned on and take the necessary steps to correct the condition which has caused the malfunction. All of these features associated with an instruction CON provides a more flexible multiple computer system installation since it enables any computer to interrupt any other computer to cause the interrupted computer to automatically execute a predetermined subroutine which may include reading specified memory locations in one of the auxiliary units 11, 12 and 13, of FIG. 1.

While the principles of the invention have now been made clear in an illustrative embodiment, there will be immediately obvious to those skilled in the art many modifications which are particularly adapted for specific applications, without departing from those principles. The appended claims are therefore intended to cover and embrace any such modifications, within the limits only of the true spirit and scope of the invention.

STORE LOCATION COUNTER (SLC)

The instruction SLC, which causes the address of the next instruction in the location counter (bit positions 22 through 34 of the G register) to be stored in memory, is executed in a manner similar to the instruction STI to store the index (the right half of the G register bit positions 2 through 14). The octal codes for the instructions SLC and STI differ only by the half word indicator digit in position 2. A bit 1 in the half word indicator position 2 causes the right half of the A register to be stored, whereas a bit 0 in that position causes the left half of the G register to be stored.

Since the octal code for the instruction SLC is 25, flip-flops D5, D3 and D1 are true during the mode In after the instruction SLC is read during the mode Ic. During the last phase Do Kc' of the mode In (see FIG. 8), the word indicator position bits are sampled and if a bit 0 is detected, a flip-flop R43 is reset in accordance with the following logic equations:

$$1R43 = I4'\ I1\ T1 \qquad (22)$$

$$0R43 = Z1'\ Go'\ T22\ \underline{In}\ Do + Z1'\ Go\ T2\ \underline{In}\ Do \qquad (23)$$

Thus, the flip-flop R43 is set at time T1 and reset at time T22. At the end of the word time, the flip-flop Do and I1 are reset by the following logic:

$$0Do = I1\ Do\ T41 \qquad (24)$$

$$0I1 = I2\ I1\ Do\ T41 \qquad (25)$$

The next word time, the flip-flop R43 sets a flip-flop R42 at time T22 for gating the location counter (G register) into the B register. It should be recalled that in the illustrative embodiment, the computer described in the aforementioned application Ser. No. 187,319 utilizes the B register for all store and read operations; i.e., every number or instruction transferred into or out of memory is routed through the B register.

If the indicator bit had been a bit 1, the instruction STI would have been indicated, the flip-flop R43 would not have been reset by the logic of Equation 23, indicating that the right half of the G register should be written into the right half of the memory location specified. However, for the instruction SLC, the flip-flop R43 is reset and the flip-flop R42 is set during times 22 through 34 instead of 2 through 14 in accordance with the following logic equations:

$$1R42 = D2'\ D1\ U1\ R43\ T1 + D5\ D2'\ U1\ D4'\ R43'\ T21 \qquad (26)$$

$$0R42 = 13a'\ Kc\ T14 \qquad (27)$$

where K41 is equal to Kc T41 and U1 is the first phase of the execute mode of sequence control. It should be noted by reference to FIG. 9 that the timing signal T14 occurs again at time T34 since it is provided by the logic P5 P4 P3. Thus, term R42 is the address time for the related instructions SLC and STI to gate the respective left and right half address portions of the G register into the B register in accordance with the following logic equations:

$$1B41 = G1'\ NR1\ D5 + B1\ I4'\ Do'\ R42' \qquad (28)$$

$$0B41 = G1\ NR1\ D5 + B1'\ I4'\ Do'\ R42' \qquad (29)$$

where NR1 is a primary gate term for R42 D6' I1' T1' as described in the aforementioned application Ser. No. 187,319. It should be noted that this implementation of the logic for SLC time shares the logic for the instruction STI. Accordingly, the address being stored is complemented just as the index would be. Therefore to restore the address to the G register in its proper form, the programmer must recomplement. This minor inconvenience to the programmer is more than offset by the economy achieved in the logic network. However, if convenience is desired at the expense of economy, non-complementing gates similar to the complementing gates of Equations 28 and 29 may be added for the instruction SLC and the complementing gates of Equations 28 and 29 limited to the instruction STI.

The mechanization of the program interrupt logic is such that the computer being interrupted by a signal Xib via its gate 32 (FIG. 3) is not actually interrupted until the third phase of the mode Ic, denoted by the sequence control term Ic Do Kc' shown in FIG. 8, since the gates 35 and 36 through which the pair of instructions SLC-TRA are read must be enabled by the signals Do and Ic. In that manner the left hand instruction SLC is always automatically executed first.

If a program interrupt occurs just as a transfer instruction is executed, a conflict in sequence control may arise in the illustrated embodiment. For example if the instruction TRA to transfer unconditionally to an address found in a left hand instruction location, the address of the next instruction is transferred into the location counter via the flip-flop G41 from the Z register during times T22 through T34. The timing is determined by the following logic:

$$1N5 = Kc'\ Do\ T21 \qquad (30)$$

$$0N5 = Do\ P5\ P4\ P3 \qquad (31)$$

where $P5\ P4\ P3 = T34$, thus terminating the operation after thirteen address bits have been transferred into the location counter in accordance with the following logic:

$$1G41 = Z1\ \underline{Ho}\ N5\ Go'\ P6 \qquad (32)$$

$$0G41 = Z1'\ \underline{Ho}\ N5\ Go'\ P6 \qquad (33)$$

But if the address to be transferred to is in the right hand instruction location, the flip-flop Go of the sequence control logic is set during the execute mode In at time T22 by the bit G22, thereby causing the address bits to be temporarily stored into the flip-flops D6 to D1 and C6 to C1 and a flip-flop R43, as disclosed in the aforementioned copending application Ser. No. 187,319, during bit times T2 to T14. The control logic for the flip-flop N5 is as follows:

$$1N5 = \underline{U1}\ \underline{M7}\ T1\ D6 \qquad (34)$$

$$0N5 = Do\ T14 \qquad (35)$$

Thereafter, at times T22 to T34 the address bits are copied into the location counter by the following logic:

$$1G41 = R43\ \underline{Ho}\ N5\ Go\ P6 \qquad (36)$$

$$1G41 = R43'\ \underline{Ho}\ N5\ Go\ P6 \qquad (37)$$

Thus at time T22, the bit G22 is sampled to determine whether address bits are to be copied into the D and C registers (FIG. 3). A conflict arises if the computer is immediately thereafter interrupted because the control flip-flop Go should not be set in order to execute next the left hand instruction of the instruction pair SLC–TRA instead of the right hand instruction to which the transfer instruction has just jumped.

To resolve the conflict, the setting of the flip-flop Go must be inhibited. That cannot be accomplished by the term Xib since by then the instruction SLC is in the B register (FIG. 3) and the flip-flop Xi1, assuming the computer 1 is the one being interrupted, is reset via the gate 31. Accordingly, the term Xib is effectively stored in another flip-flop to inhibit setting the flip-flop at time T22. The flip-flop selected for that purpose is the flip-flop Ca11 (FIG. 2) since a programmed interrupt may occur only when the flip-flop Xb1 (FIG. 2) is not set and the flip-flop Ca11 is not being used for access control to an auxiliary unit. The logic for that inhibit function is as follows:

$$1Ca11=\underline{I41}\ Xib \quad (38)$$

$$0Ca11=Kc'\ T1 \quad (39)$$

$$1Go=G1\ T22\ In\ Kc\ Ca11' \quad (40)$$

Where I41 is the last bit time of the mode Ic, at which time the flip-flop Xj1 is set and the flip-flop Xi1 is reset. Flip-flops Ca21 and Ca31 are similarly employed for storing the Xib terms in computers 2 and 3, respectively.

Figure 2:
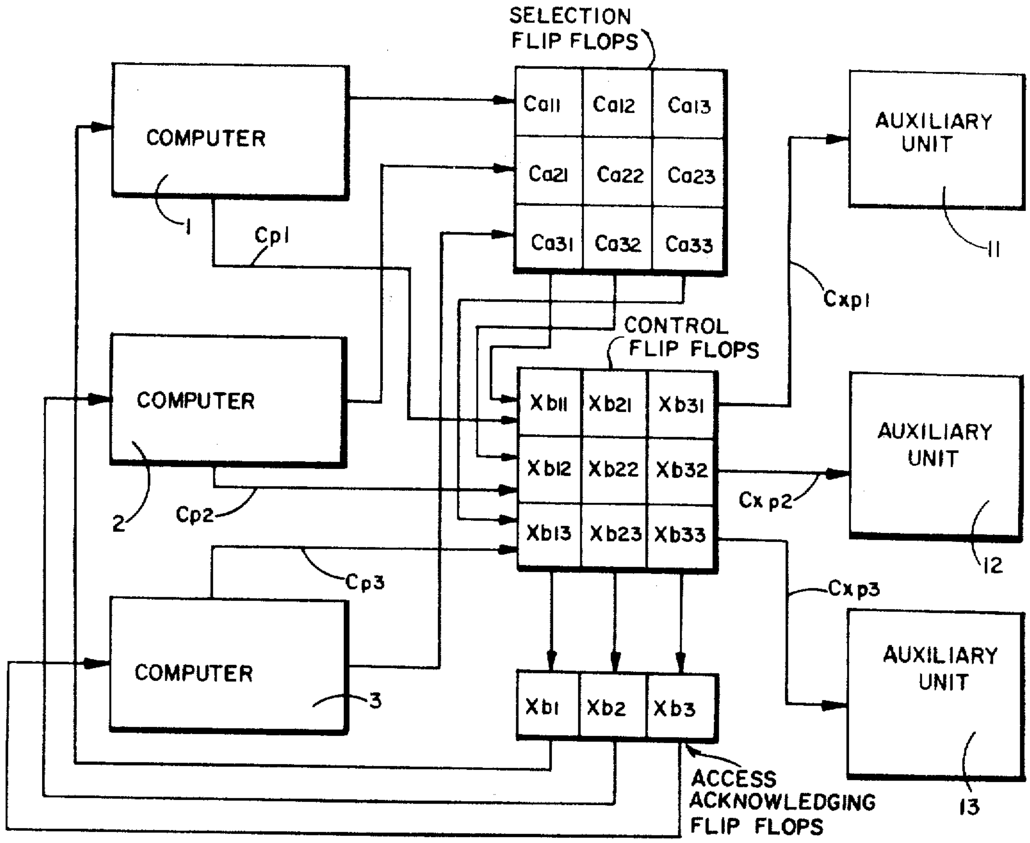
FIG. 2 is a block diagram of a logic network for control of communications between the computers and auxiliary units of the system illustrated in FIG. 1.

A more complete description of FIGURE 2 can be found in the co-pending application, Ser. No. 334,346, referred to in column 4 hereof. As indicated therein, the selection flip-flops, Ca11 through Ca33, enable a particular computer to address a particular auxiliary unit. The control flip-flops, Xb11 through Xb33, prevent two computers from addressing auxiliary units simultaneously. Access acknowledging flip-flops, Xb1, Xb2, and Xb3, transmit signals to the addressing computers to indicate that access to an addressed unit has been obtained.

Although the logic implementations only of computer 1 has been described in detail for brevity, it should be understood that the implementation of logic is similar for the computers 2 and 3.

What is claimed is:

1. In a multiple computer system, a plurality of program controlled computers, each having
- a stored program including instructions and at least one subroutine,
- an interrupt control signal representing an interrupt control instruction having an address portion,
- means for detecting and executing instructions of said stored program including a subroutine that may be detected and executed only in response to said interrupt control signal,
- means responsive to a stored instruction of said stored program commanding an interruption for producing said interrupt control signal for the immediate interruption of selected ones of said computers, if any are specified by said instructions, and a delayed interrupt control signal for self-interruption after a predetermined number of delay periods, if a delayed interruption is specified by said instruction,
- means responsive to said address portion of said interrupt control instruction for transmitting said interrupt control signal to selected ones of said computers,
- means responsive to said interrupt control signal for interrupting the main program of each computer selected and causing said subroutine to be executed,
- and means responsive to said delayed interrupt control signal for interrupting the stored program of said computer after said predetermined delay time.

2. In a multiple computer system, a plurality of program controlled computers as defined in claim 1, each computer including
- an interrupt interlock means responsive to either said interrupt control signal or said delayed interrupt contol signal for preventing the computer from being further interrupted,
- and means responsive to a stored instruction for clearing said interrupt interlock, whereby an interrupted computer is prevented from being further interrupted until execution of said subroutine has been completed and said clearing instruction executed.

3. In a multiple computer system, a plurality of computers, each having
- a stored program comprising instructions and at least one subroutine,
- an interrupt control signal representing an interrupt control instruction having an address portion,
- means for detecting and executing instructions of said stored program including a subroutine that may be detected and executed only in response to said interrupt control signal,
- means responsive to a stored instruction of said program commanding an interruption for producing said interrupt control signal for the immediate interruption of selected ones of said computers, if any are specified by said instructions, and a delayed interrupt control signal for self-interruption after a predetermined number of delay periods, if a delayed interruption is specified by said instruction,
- a plurality of real time clocks, each including a register for storing a number representing a number of delay periods for a delayed interruption,
- means responsive to the address portion of said interrupt control instruction for transmitting said interrupt control signal to selected ones of said computers,
- means responsive to said interrupt control signal for interrupting the main program of each computer selected and causing said subroutine to be executed,
- means responsive to the address portion of said interrupt control instruction for selectively starting one of said real time clocks, and thereby causing the clock to measure the number of delay periods represented by the number stored therein, in accordance with the code configuration of the address portion of said interrupt control instruction,
- means responsive to a selected real time clock, if any one has been selected, for producing a delayed interrupt control signal when the number of delay periods represented by the number stored therein has been measured,
- and means responsive to said delayed interrupt control signal for interrupting the stored program of said computer after said predetermined delay time.

4. In a multiple computer system, a plurality of program controlled computers as defined in claim 3, each computer including
- a stored program comprising instructions and at least one subroutine,
- an interrupt interlock means responsive to either one of said interrupt control signal or said delayed interrupt control signal for preventing the computer from being further interrupted,
- and means responsive to a stored instruction for clearing said interrupt interlock, whereby an interrupted computer is prevented from being further interrupted until execution of said subroutine has been completed and said clearing instruction executed.

5. In a multiple computer system, a plurality of program controlled computers, each having
- a cyclical memory for storing a program of instructions and data to be processed in accordance with said program, said instructions being stored in memory locations in pairs, one instruction in each half of a memory location,
- sequencing means for normally executing instructions of a stored program in a predetermined sequence, including a location counter for storing the address of the next instruction which is increased to indicate the location of the next half of a pair of instructions each time an instruction is executed, whereby instructions are automatically executed by pairs in address sequence, unless the sequence is interrupted,
means responsive to a stored instruction commanding an interruption for producing an interrupt control signal for the immediate interruption of selected ones of said computers, if any are specified by said instruction, and a delayed interrupt control signal for self-interruption after a predetermined number of delay periods, if a delayed interruption is specified by said instruction,
means responsive to said interrupt control signal for interrupting said instruction sequencing means and causing a predetermined pair of instructions to be read from a predetermined memory location without reference to said location counter and without altering the address code therein, the first instruction of said predetermined pair being an instruction to store the address code of said location counter in a specified memory location, and the second of said predetermined pair being an instruction to transfer control to an instruction specified by the address portion of said instruction,
and means responsive to said delayed interrupt control signal for interrupting the stored program of said computer after said predetermined delay time.

6. In a stored program digital computer
a recirculating memory including a loop having at least one selectively addressable memory location cyclically read and restored to permit a binary number stored therein to be serially operated upon once during each loop cycle starting with the least significant binary digit,
unit subtractor means for selectively using said location as a real time clock to measure a period of time proportional to a binary number stored therein, said means comprising a control flip-flop set once during each loop cycle before the first binary digit of said number is read, logic gates controlled by said flip-flop for complementing each binary digit in sequence while said flip-flop is set, and means for resetting said flip-flop in response to the first binary digit one of said number complemented, whereby only binary digits up to and including the first binary digit one are complemented during each loop cycle,
and means responsive to said unit subtractor means for transmitting a signal after the number stored therein has been decremented to zero.

7. In a stored program digital computer having a recirculating memory including a loop comprising a plurality of selectively addressable memory locations cyclically read and restored to permit binary numbers stored therein to be serially operated upon once during each loop cycle starting with the least significant binary digit of each number, each memory location being preceded by a synchronizing bit position,
means responsive to execution of an instruction for selecting one of said locations as a real time clock to measure a period of time proportional to a binary number stored therein by storing a synchronizing digit in said synchronizing bit position,
a control flip-flop set by said synchronizing digit once during each loop cycle as said synchronizing digit is read and restored,
logic gates controlled by said flip-flop for complementing each binary digit in sequence while said flip-flop is set,
means for resetting said flip-flop in response to the first binary digit one of said number complemented, whereby only binary digits up to and including the first binary digit one are complemented during each loop cycle,
and means for transmitting a signal after the number stored therein has been decremented to zero upon said flip-flop again being set by said synchronizing digit and not being reset by a binary digit one of said number read and complemented during one complete read and restore cycle of said loop for the selected one of said locations.

8. A combination as described in claim 7 including means for automatically resetting said flip-flop immediately before the next memory location of said loop is read and restored.

9. In a stored program digital computer
a recirculating memory including a loop having a plurality of selectively addressable memory locations cyclically read and stored to permit a binary number stored therein to be serially operated upon once during each loop cycle starting with the least significant binary digit of the location selected,
unit subtractor means responsive to execution of a stored instruction for selectively using a particular one of said locations as a special real time clock to terminate a computer operation after a period of time proportional to a binary number stored therein, said means comprising a control flip-flop set once during each loop cycle before the first binary digit of said number is read, logic gates controlled by said flip-flop for complementing each binary digit in sequence while said flip-flop is set, and means for resetting said flip-flop in response to the first binary digit one of said number complemented, whereby only binary digits up to and including the first binary digit one are complemented during each loop cycle,
means responsive to said unit subtractor means for transmitting a signal after the number stored therein has been decremented to zero,
and means responsive to said transmitted signal for terminating the execution of an operation in said computer and turning on an alarm.

10. In a stored program digital computer having a recirculating memory including a loop comprising a plurality of selectively addressable memory locations cyclically read and restored to permit binary numbers stored therein to be serially operated upon once during each loop cycle starting with the least significant binary digit of each number, each memory location being preceded by a synchronizing bit position,
means responsive to execution of an instruction for selecting a predetermined one of said locations as a real time clock to measure a period of time proportional to a binary number stored therein by storing a synchronizing digit in said synchronizing bit position,
a control flip-flop set by said synchronizing digit once during each loop cycle as said synchronizing digit is read and restored,
logic gates controlled by said flip-flop for complementing each binary digit in sequence while said flip-flop is set,
means for resetting said flip-flop in response to the first binary digit one of said number complemented, whereby only binary digits up to and including the first binary digit one are complemented during each loop cycle,
means for transmitting a signal after the number stored therein has been decremented to zero upon said flip-flop again being set by said synchronizing digit and not being reset by a binary digit one of said number read and complemented during one complete read and restore cycle of said loop for the selected one of said locations,
and means responsive to said transmitted signal for terminating the execution of an operation in said computer and turning on an alarm.

11. A combination as described in claim 10 including means for automatically resetting said flip-flop immediately before the next memory location of said loop is read and restored.

(References on following page)

References Cited by the Examiner

UNITED STATES PATENTS

| | | | |
|---|---|---|---|
| 2,835,807 | 5/1958 | Lubkin | 340—174.1 |
| 2,960,683 | 11/1960 | Gregory et al. | 340—172.5 |
| 3,017,092 | 1/1962 | Rent et al. | 235—157 |
| 3,048,332 | 8/1962 | Brooks et al. | 340—172.5 |
| 3,146,345 | 8/1965 | Conover | 235—170 |
| 3,214,739 | 10/1965 | Gountanis et al. | 340—172.5 |
| 3,221,309 | 11/1965 | Benghiat | 340—172.5 |
| 3,238,506 | 3/1966 | Jung et al. | 340—172.5 |
| 3,251,040 | 5/1966 | Burkholder et al. | 340—172.5 |
| 3,263,219 | 7/1966 | Brun et al. | 340—172.5 |

OTHER REFERENCES

Chao, S. K., et al.: Duplexing Mobidic Computers, pp. 46–58, December 1959.

Porter, R. E.: The RW–400—A New Polymorphic Data System in Datamation, pp. 8–14, January/February 1960.

Blaauw, G. A., et al.: Program-Interrupt System in IBM Technical Disclosure Bulletin 4(4), pp. 20–22, September 1961.

Olsen, M. M.: Interrupt for Computer System in IBM Technical Disclosure Bulletin, pp. 32–33, October 1962.

ROBERT C. BAILEY, *Primary Examiner.*

J. P. VANDENBURG, *Assistant Examiner.*